US008988543B2

(12) United States Patent
Göktekin et al.

(10) Patent No.: US 8,988,543 B2
(45) Date of Patent: Mar. 24, 2015

(54) CAMERA BASED METHOD FOR TEXT INPUT AND KEYWORD DETECTION

(75) Inventors: Cüneyt Göktekin, Potsdam (DE); Oliver Tenchio, Potsdam (DE)

(73) Assignee: Nuance Communications, Inc., Burlington, MA (US)

( * ) Notice: Subject to any disclaimer, the term of this patent is extended or adjusted under 35 U.S.C. 154(b) by 16 days.

(21) Appl. No.: 13/095,937

(22) Filed: Apr. 28, 2011

(65) Prior Publication Data
US 2011/0267490 A1 Nov. 3, 2011

(30) Foreign Application Priority Data
Apr. 30, 2010 (EP) .................................... 10161624

(51) Int. Cl.
H04N 5/228 (2006.01)
H04N 1/00 (2006.01)
G06K 9/00 (2006.01)
(Continued)

(52) U.S. Cl.
CPC ........ H04N 1/00307 (2013.01); G06K 9/00463 (2013.01); G06K 9/3258 (2013.01); H04N 1/32048 (2013.01)
USPC .......................... 348/222.1; 382/229; 382/182

(58) Field of Classification Search
CPC .............. G06K 9/00463; G06K 9/325; G06K 9/00469; G06K 9/00456; G06K 9/72; G06K 9/723; G06K 9/726
See application file for complete search history.

(56) References Cited

U.S. PATENT DOCUMENTS 5,384,863 A * 1/1995 Huttenlocher et al. ....... 382/173
5,491,760 A * 2/1996 Withgott et al. .............. 382/203
5,511,148 A * 4/1996 Wellner ......................... 358/1.6
(Continued)

FOREIGN PATENT DOCUMENTS

EP 2 189 926 B1 5/2010
EP 2 410 465 A1 1/2012
(Continued)

OTHER PUBLICATIONS

Ho, Jason, "CapnTrans Demo," Retrieved from the Internet: http://www.youtube.com/watch?v=QRZe3qV9gBO, Retrieved on: Jun. 18, 2012, XP007920719, whole document.
(Continued)

Primary Examiner — Twyler Haskins
Assistant Examiner — Wesley J Chiu
(74) Attorney, Agent, or Firm — Hamilton, Brook, Smith & Reynolds, P.C.

(57) ABSTRACT

The present invention relates to a camera based method for text input and detection of a keyword or of a text-part within page or a screen comprising the steps of: directing a camera module on the printed page and capturing an image thereof; digital image filtering of the captured image; detection of word blocks contained in the image, each word block containing most likely a recognizable word; performing OCR within each word block; determination of A-blocks among the word blocks according to a keyword probability determination rule, wherein each of the A-blocks contains most likely the keyword; assignment of an attribute to each A-block; indication of the A-blocks in the display by a frame or the like for a further selection of the keyword; further selection of the A-block containing the keyword based on the displayed attribute of the keyword; forwarding the text content as text input to an application.

19 Claims, 10 Drawing Sheets

(51) Int. Cl.
*G06K 9/32* (2006.01)
*H04N 1/32* (2006.01)

(56) References Cited

U.S. PATENT DOCUMENTS

| | | | |
|---|---|---|---|
| 5,642,518 A * | 6/1997 | Kiyama et al. | 704/7 |
| 5,649,222 A * | 7/1997 | Mogilevsky | 715/257 |
| 7,069,506 B2 * | 6/2006 | Rosenholtz et al. | 715/273 |
| 7,330,608 B2 * | 2/2008 | Berkner et al. | 382/298 |
| 7,450,960 B2 * | 11/2008 | Chen | 455/550.1 |
| 7,787,693 B2 * | 8/2010 | Siegemund | 382/176 |
| 8,098,934 B2 * | 1/2012 | Vincent et al. | 382/177 |
| 8,208,737 B1 * | 6/2012 | Ie | 382/229 |
| 8,713,433 B1 * | 4/2014 | Ouyang et al. | 715/261 |
| 2003/0169924 A1 | 9/2003 | Nishiyama et al. | |
| 2004/0189804 A1 * | 9/2004 | Borden et al. | 348/169 |
| 2005/0052558 A1 * | 3/2005 | Yamazaki et al. | 348/333.12 |
| 2005/0169527 A1 * | 8/2005 | Longe et al. | 382/177 |
| 2006/0017752 A1 | 1/2006 | Kurzweil et al. | |
| 2006/0098874 A1 | 5/2006 | Lev | |
| 2007/0047813 A1 * | 3/2007 | Simske et al. | 382/176 |
| 2007/0106468 A1 * | 5/2007 | Eichenbaum et al. | 701/211 |
| 2008/0118162 A1 * | 5/2008 | Siegemund | 382/229 |
| 2009/0177653 A1 * | 7/2009 | Hirabayashi | 707/5 |
| 2009/0227283 A1 * | 9/2009 | Pylvanainen | 455/556.1 |
| 2010/0172590 A1 * | 7/2010 | Foehr et al. | 382/217 |
| 2010/0293460 A1 * | 11/2010 | Budelli | 715/702 |
| 2011/0081948 A1 * | 4/2011 | Shirai et al. | 455/556.2 |
| 2011/0249900 A1 * | 10/2011 | Thorn et al. | 382/195 |
| 2011/0267490 A1 | 11/2011 | Goktekin et al. | |
| 2012/0131520 A1 * | 5/2012 | Tang et al. | 715/863 |
| 2012/0134590 A1 * | 5/2012 | Petrou et al. | 382/182 |
| 2013/0113943 A1 * | 5/2013 | Wormald et al. | 348/207.1 |
| 2013/0234945 A1 | 9/2013 | Goktekin | |

FOREIGN PATENT DOCUMENTS

| | | |
|---|---|---|
| EP | 2 383 970 A1 | 7/2013 |
| EP | 2 637 128 A1 | 9/2013 |
| WO | WO 02/25575 A3 | 3/2002 |
| WO | WO 2005/101193 A2 | 10/2005 |
| WO | WO 2006/002706 A1 | 1/2006 |
| WO | WO 2007/082536 A1 | 7/2007 |
| WO | WO 2008/063822 A1 | 5/2008 |

OTHER PUBLICATIONS

"iPhone User Guide—for iPhone OS 3.1 Software," Apple, Inc., Dec. 31, 2009, pp. 31-36.

Iketani, A, et al., "Video Mosaicing Based on Structure from Motion for Distortion-Free Document Digitization," *Computer Vision ACCV*, Part II, LNCS 4844, pp. 73-84 (2007).

Nakajima, N, et al., "Video Mosaicing for Document Imaging," *Proc. CBDAR, Demo Session*, pp. 171-178 (2007).

* cited by examiner

| No. | Quantity | characteristics | Probab. database | Probability | Word |
|---|---|---|---|---|---|
| 1 | 5 | bold, big, underlined | 2 | 20 | Mongolei |
| 2 | 3 | | 2 | 6 | Volksrepublik |
| 3 | 2 | | 3 | 6 | China |
| 4 | 2 | close, close | 1 | 5 | Grenzlänge |
| 5 | 1 | | 4 | 4 | Russland |
| 6 | 1 | close | 1 | 3,4 | Äußere |
| 7 | 1 | close | 1 | 3 | Autonomes |
| 8 | 1 | medium close | 1 | 2 | Verfassungsänderung |
| 9 | 1 | | 1 | 1 | Binnenstaat |
| 0 | 1 | | 1 | 1 | Atlanten |
| B-1 | 1 | far | 2 | 0,4 | Ostasien |
| B-2 | 1 | far | 1 | 0,2 | Unterschied |
| B-3 | 1 | | 0,2 | 0,2 | Inneren |
| B-4 | 1 | | 0,2 | 0,2 | Gebiet |
| B-5 | 1 | far | 1 | 0,2 | Mongolische |

FIG. 6

- Camera based text input activated

- Camera is activated in video mode and displays its image in a camera display

- Camera view is directed towards a keyword or text-part which shall be detected

- Capturing an image of a page section containing the keyword/text-part

- Digital image filtering to achieve an artifact reduced image in regards to better OCR results

- Detection of word-blocks within the artifact reduced image, each containing most likely one word

- OCR of text within each word-block receiving its content as a word

- Determination of A-blocks according to a keyword probability determination rule taking preferably a database with filler words and words with high probability into account, wherein each A-block contains a possible keyword or text-part

- Assignment of each A-block with a enumerated attribute

- Displaying the artifact reduced image with overlaid indicated A-blocks and their attributes

- Further selection of the A-block containing the keyword by pressing a respective key or by selecting it via arrow keys, scroll-wheel or the like

- Optionally displaying the further selected keyword in a table together with alternative similar words according to a word correction database (T9 for instance) and selecting the desired word thereof

- Forwarding the selected word / keyword as text input to the current application

Fig. 10

CAMERA BASED METHOD FOR TEXT INPUT AND KEYWORD DETECTION

FIELD OF THE INVENTION

The present invention relates to a method for a camera based electronic device and in particular for a camera based mobile communication device comprising an optical detection, a determination of possible keywords or text-parts and a further selection of a keyword or the text-part as text input for a current software application instead of typing said text in to said device.

In particular the method replaces a manual typing of text into a mobile communication device by capturing an image of a printed page containing said text followed by a semi-automatic detection and selection of said text, which can be a keyword or a text-part, and using said text as text input for a current application running on the mobile communication device. As used in the context of the present description a page is intended as a printed page.

BACKGROUND OF THE INVENTION

Mobile communication devices with integrated camera module are further approaching the market and show up already a good market penetration and use in daily life, taking over the market of simpler mobile phones. Far beyond phoning and email reading they get used for taking pictures, for Internet access and for other services including WAP services and camera based services. With an increasing interaction between the user and the mobile communication device and with increasing complexity of input data, the interface between the user and the mobile communication device gets more important. Better mobile phones and mobile communication devices from Research in Motion (Blackberry) and from Nokia (Communicator) for instance comprise a more complete keypad as they were mainly intended to be used for email reception and email sending besides a normal phoning. Following and latest mobile communication devices for instance from Apple (iPhone), Nokia, Motorola and others comprise an even bigger screen as touch-screen which allows a more convenient Internet use, looking at pictures as well as such touch-screens give a much better data input possibility. The term "smart-phone", for sake of clarity, is also found in the market and is represented herein by the term mobile communication device. Speech recognition via built in microphone and speech recognition algorithms can be used for selecting phonebook names and for a small amount of control commands. However in mobile communication devices the touch-screen or the built-in keypad is necessarily small and it is still cumbersome to input data as steadily new applications on the market require even more interaction with an increasing amount of data input.

As an integration of camera modules in mobile phones and in mobile communication devices is already state of the art, there easier text input possibilities would be appreciated, as for instance using the build in camera module for text recognition and for an optical input of text.

From EP-08 169 713 by the same inventors as of the current invention there is disclosed a method and a device for using a mobile communication device as a reading device for blind or visually impaired people. Therefore an image of the text page, which shall be read, is captured semi-automatically, the image data are then transformed via optical character recognition (OCR) to text data and the text data are then converted via text-to-speech software to audio data which are then output via a loudspeaker of the mobile communication device. The text data within a book page, a newspaper, a menu or the like get instantly recognized and read as an image of said text is captured, wherein a filtering inclusive shadow compensation, rotation of the text, binarization, unwarping and the like for a following OCR and text-to-speech conversion is processed. In essence EP-08169713 describes a method for image filtering of captured images containing text, wherein the image is captured with camera modules of a limited quality, as they are built in mobile phones or the like, adapted for optimized OCR results.

From EP-09 161 549 of the same inventors as of the current invention there is disclosed a method for capturing an image, processing the image data, extracting text and objects thereof and sending this data via the same camera based mobile communication device to a server system for translations, for best price searches, for getting information about the local position and the like. There are described data communication channels with possible applications, which require input of respective keywords or text-parts as search targets. But keyword or text-part as search target has still to be typed in manually via the keypad of the mobile communication device.

WO 2008/063822 A1 discloses and describes a method for a mobile communication device with integrated camera, wherein a video stream is analyzed in real time to detect a word within a central region of the image which is indicated by a cross-hair in the display. The so detected word is indicated then by a background color or by highlighting the word, which can be selected then as text input. This method is very useful as alternative text input possibility to a keypad. But the mobile communication device with its cross-hair has to be targeted on the desired keyword to be detected precisely which might be difficult sometimes. In fact, while holding a camera module, little angle variations of the camera module can effect big position variations of the captured text within the camera image. A keypress for capturing the image can often result in enough movement of the mobile communication device, such that the desired keyword is out of the center point of the captured image and so is not detected anymore.

Reading a phone number on a text page which shall be used then for a phone call requires sometimes typing a thirteen digit long number (inclusive country code) in, which might be cumbersome, in particular for some senior people having no good short term memory anymore. So an easy optical method for a number recognition out of a text page and the conversion of said number as usable input for a mobile phone or the like would be an advantage.

WO 2005/101 193 discloses a system comprising a scanner and at least one display and/or a speaker to provide the user of the scanner an indication of actions available for a portion of a document from which scanned information is obtained. Therein the scanned information of the document is used either to identify the document among documents in a database or to identify via markups in the document next possible user actions, indicating the next possible actions on the display or via loudspeakers. Said disclosure comprises an intelligent identification process for the scanned information of the document. But not foreseen therein is a method applicable on mobile communication devices for a quick determination and indication of keywords within a scanned text and highlighting the keywords for a further selection.

It would also be desirable to have a solution, wherein a user could hold a camera based mobile communication device over a text page whereupon an image containing the desired text-part is captured, the text-part gets detected and selected, whereof possible keywords get determined for a further selection of the desired keyword, and whereupon the further selected keyword gets taken as text input for a search application or for the like.

SUMMARY OF THE INVENTION

The invention is set forth and characterized in the main independent claims, while dependent claims describe other advantageous characteristics of the invention.

The objective of the present invention is to overcome the shortcomings explained above and to provide a camera based method for text input and detection of a keyword displayed on any page or screen by simply directing a camera module on a section of the page or the screen containing the keyword.

In other words, the purpose of the invention is to provide a text input feature for a mobile communication device, wherein the keyword can be captured by the camera module, detected and selected as text input, instead of having to input the keyword manually via alphanumerical keys.

Another objective is to provide a camera based method for text input and keyword detection, wherein the captured image of the text containing the keyword gets analyzed for finding out the most probable keywords thereof, whereupon the keyword can be further selected and taken as text input.

Another objective is to provide a camera based method for text input and detection of a text-part comprising multiple words, wherein the captured image contains the text-part, the text-part get detected and further selected and taken as text input.

Another objective of the present invention is that said camera based method for text input and keyword detection is operable on conventional mobile communication devices with a limited camera image quality and with a limited calculating power.

The above objectives and purposes as well as further objectives and purposes which will become apparent from the following description are achieved by the features described in the independent claim and by additional features and characteristics described in the independent claims.

As apparent from the foregoing, the present invention provides a camera based method fox text input and keyword detection out of any page, screen or display containing said keyword, wherein the camera module gets directed on the page, the image of the camera module containing said keyword or a text-part. The method runs on electronic devices with a connected or integrated camera module, preferably on mobile communication devices.

As used in the present description, a mobile communication device is intended to mobile phones, and electronic devices with an integrated or connected camera module Furthermore, the term keyword is intended to comprise in particular most likely one word or number, but it can also comprise multiple words as text-parts in some application cases. The term page can always also be a screen, display or the like containing displayed text and objects.

The method according the present invention replaces a manual alphanumerical text or keyword input via a keypad by simply directing the camera module on the page or screen containing said keyword, capturing an image containing said text or keyword, whereupon in the keyword detection mode preferably all words in the captured image get analyzed according a keyword determination rule and indicated in the display for a further selection by the user.

A preferred detection method takes into account attributes of the text words for the probability determination, such attributes being selected from a group including one or more of bold, underlined, hand underlined, being close to the center point of the captured image and being indicated by a fingertip.

Another preferred detection method in regards to the probability determination for a detected word to be most likely the keyword takes into account also the text content which was detected via OCR and a database, wherein the database contains filler words which are assigned with a low probability and other words which are assigned with a higher probability, whereas the probability for a word being the keyword is calculated by multiple characteristics as distance to the center point, word attributes, respective probability parameter contained in the database and the application.

Preferably the detected most likely keywords get indicated by a color background and overlaid numerals in the display of the mobile communication device so that the desired keyword can be then further selected by a simple respective keypress.

Preferably the above camera based method for text input allows also a detection of a text-part comprising multiple words, wherein an underlined section can be detected and further selected as text-part or wherein the text-part is defined to be within a first keyword and a second keyword and whereas the first and second keyword has to be selected as described above.

Another preferred method allows to capture an image of a text page containing a phone number, detecting the phone number and further selecting it for a running application which can be for instance making a phone call with that number.

A solution of a preferred embodiment according the present invention is disclosed in the following drawings with detailed description but it shall not be limiting the invention.

BRIEF DESCRIPTION OF THE DRAWINGS

FIG. 6 is a table of listed word contents of the word blocks with characteristics for a probability calculation leading to the preselection of the A-blocks with indications as shown in FIG. 5.

FIG. 10 shows a flow diagram of a process for the detection and the selection of the keyword.

DETAILED DESCRIPTION OF THE INVENTION

Figure 1:
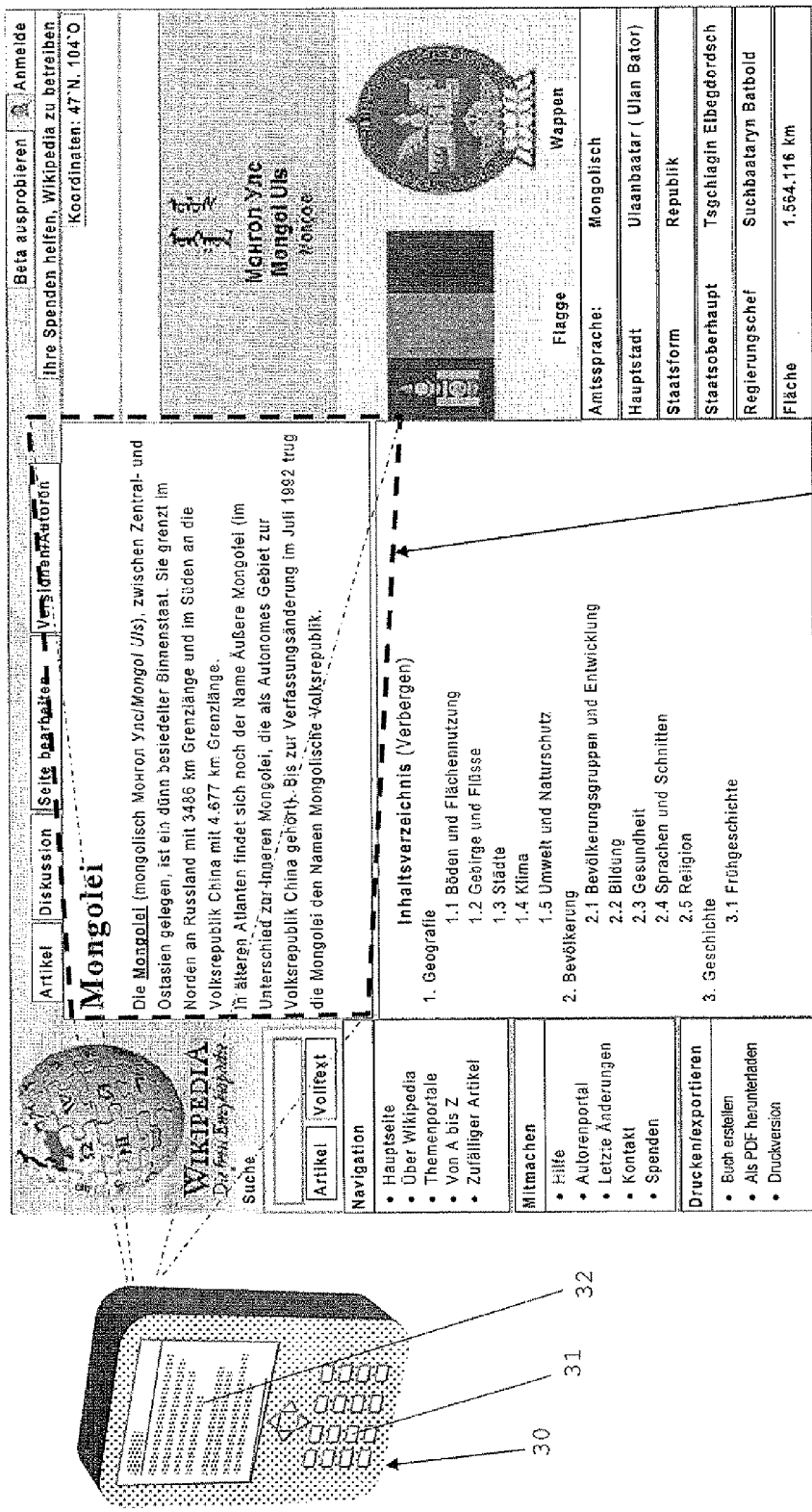
FIG. 1 is a drawing of a mobile communication device directed onto a page capturing an image of a section of the page.

FIG. 1 gives an overview showing a mobile communication device 30 with an integrated camera module being directed onto a page 1 containing a keyword 7 which shall be detected and converted to characters used as text input for the mobile communication device 30 for a further operation within the current application, for instance for a translation or for a search for connected information or for the like. To make sure that the keyword 7 is within a field of view of the camera module the image 2a of the camera module, preferably as video stream, gets displayed in the display 32 of the mobile communication device 30, showing the image 2a of a section of the page 1 containing the keyword 7. The projective is to detect and select the keyword 7 as quickly, easily and intelligently as possible within a captured image 2a of the section of page 1 without using the keypad 31 for inputting all the characters of the keyword 7. Upon being sure that the keyword 7 is covered by the image 2a of the camera module, the image 2a is captured by a simple keypress.

Figure 2:
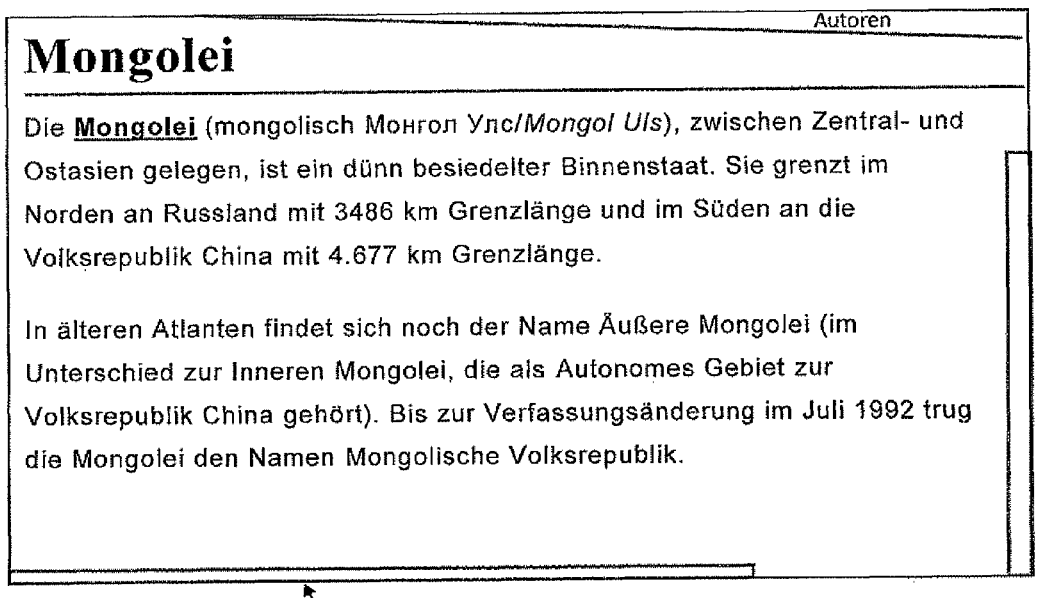
FIG. 2 shows an artifact reduced image of the section of the page containing text and lines.

In order to achieve a more robust recognition of word blocks 3 (to be described herein below with respect to FIG. 3) and in particular to achieve a better OCR of detected and of a further selected A-block 4 (to be described hereinafter with respect to FIG. 4), the captured image 2a, which is mostly a contorted and warped representation of the section of the page 1, gets preferably digitally filtered and corrected including contrast enhancement, shadow compensation, unwarping and rotation in order to obtain an artifact reduced image 2b with a substantially horizontal text alignment, which is shown in FIG. 2.

Figure 3:
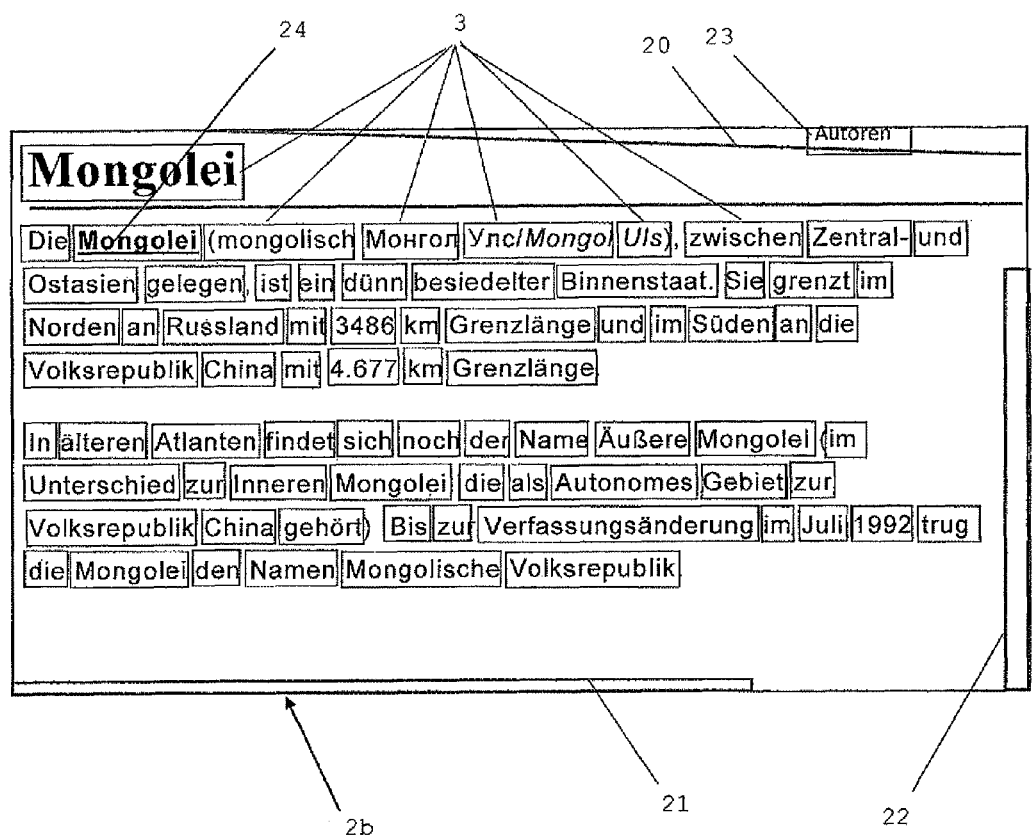
FIG. 3 shows detected word blocks within the artifact reduced image.

The artifact reduced image 2b gets analyzed for image sections which contain preferably one single word, further called word blocks 3 (FIG. 3). The detection of the word blocks 3 is achieved by digital pattern recognition algorithms based on recognition of text lines and thereupon of single characters and then of words. Therefore first of all a threshold has to be determined wherein the threshold is a degree for a decision whether a pixel belongs to a character or not; this can be performed and used in various sections of the artifact reduced image 2b, respectively. Furthermore the text lines are detected by a histogram analysis, wherein all pixels row by row get summed up within a certain section of the artifact reduced image 2b, wherein the text lines have a typical characteristic shape and have a significant higher histogram value than a blank line in between. Thereupon the characters get detected, which have substantially connected pixels. Thereupon the words get detected which have significant shorter distances between the characters than the characters between two words. Pictures and objects which do not comprise typical word characteristics, as described above, get discarded. The horizontal and vertical margins of a so detected word defines then the respective word block 3. This is processed for all words detected in this way, resulting in the word blocks 3 shown as example in FIG. 3.

Margin words 23 which are touching a margin of the captured image 2a or respectively of the artifact reduced image 2b get discarded. Image objects as for instance lines 20, 21 and 22 in the artifact reduced image 2b get analyzed as far as they are near a word. In fact, such image objects can be an underline as shown with reference numeral 24 in FIG. 3. Otherwise, if text-parts shall be detected, the analyzed lines and frames can be helpful for the detection of their margins.

Figure 4:
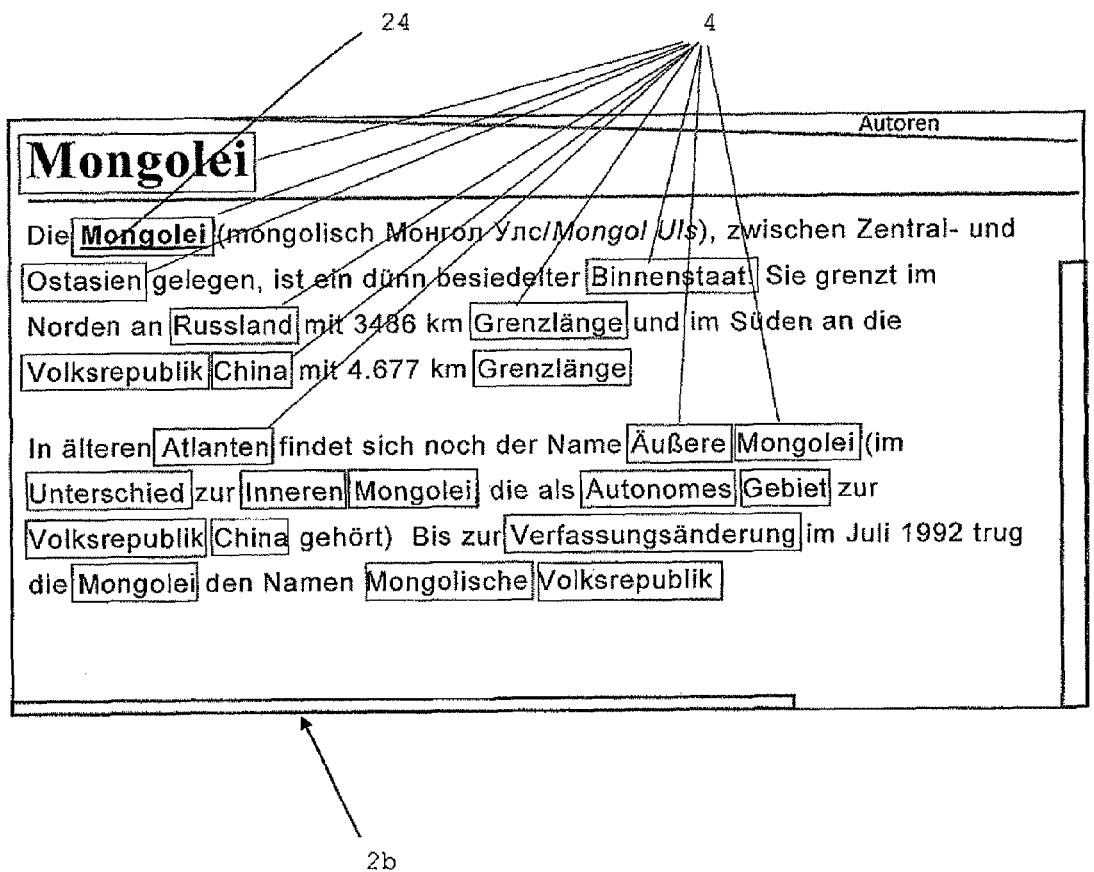
FIG. 4 shows determined preselected A-blocks containing probable keywords within the artifact reduced image.

FIG. 4 shows the artifact reduced image 2b with highlighted A-blocks 4, wherein A-blocks 4 among the word blocks 3 are determined as those word blocks 3 which contain most likely the keyword 7.

Therefore an OCR analysis of each word block 3 is performed to get its text content, whereas each text content as word is inserted into a word table 40 (FIG. 6). If by mistake two words got detected within one word block 3 then two word blocks 3 are generated, each containing one word. According to the application of the camera based method for text input and keyword detection there is applied a keyword probability determination rule on each word, taking into account preferably various parameters and/or characteristics of the respective word. Such parameters can be preferably whether the word is a substantive beginning with a capital letter, the word is bold, the size of the word, the word is underlined, whether the word is mentioned within a database as a filler word with low probability or as a word with a higher probability, the count of the word within the captured image, the distance to the center point 6 (FIG. 5) and the like.

The keyword probability determination rule takes into account preferably a database which contains filler words which have a very low probability parameter and words with a very high probability parameter. According to an application, for a translation dictionary for instance, the database could contain filler words which would have a low-medium probability parameter, for an online search application the filler words would in this case have a probability parameter of zero. Filler words contained in the database are for instance articles, adverbs, attributes and the like. It shall be mentioned that the database preferably can be selected among a set of databases according to the current application or that it can change itself within the current application as a database with learning characteristics. It is also imaginable that the probability parameters of word groups in the database get modified by the keyword probability determination rule according to the current application. Furthermore, it is imaginable that the database with its words gets downloaded or updated from a server system according to the current application or a certain field of interest, wherein for instance words with high occurrence get a respective high probability parameter.

The keyword probability determination rule takes into account preferably for each word also the distance of the respective word/word block 3 in regards to the center point 6.

The probability calculation for each word according the keyword probability determination rule results in values above or under a threshold, whereas preferably all words above the threshold are determined to be possibly the keyword 7, whereas the respective word block 3 is then determined to be a preferred A-block 4 with a higher probability containing the keyword 7, which gets indicated for a further selection. The threshold gets preferably calculated taking into account all probabilities of the detected words/word blocks 3.

FIG. 6 shows a result of a calculated and sorted word table 40 with some words in column 46 of the detected word blocks 3 and in particular with the words of the preselected A-blocks 4 of FIG. 4 containing the words with higher probability and above the threshold. Filler words within the word table 40 which are detected and calculated in respect to their probability and resulting in a very low probability are not shown anymore. Preferably the number of occurrence of each word is calculated and mentioned in table column 42, the characteristics of each word is mentioned in table column 43, the correlated probability parameters of a connected database (not shown) is mentioned in table column 44, and the calculated probability value for each respective word of column 46 is shown in column 45.

The word table with the sorted words and rows according to their calculated probability, wherein the highest probability is on top, is shown in FIG. 6, whereas, as a result, the respective preselected words are shown in FIG. 4, each preselected word being indicated by an overlaid frame around its respective A-block 4.

Figure 5:
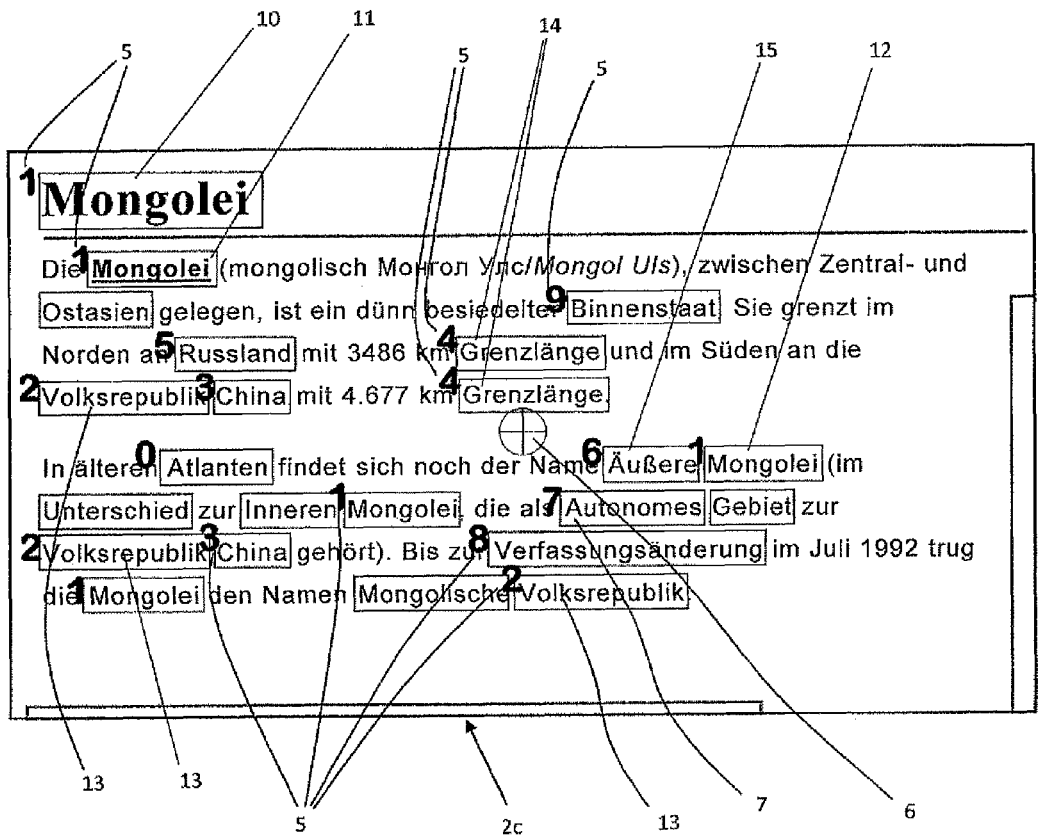
FIG. 5 shows indicated attributes of the A-blocks as assignments for a further selection, within the artifact reduced image displayed on the mobile communication device.

For the further selection of the keyword 7 among the A-blocks 4 by the user, the A-blocks get assigned by attributes 5 (only some are indicated in FIG. 5, 7, 8, 9), which are preferably numbers starting from 1 to 9 and 0, which can be easily input for the further selection via the phone keypad. The so assigned attributes 5 as numbers are shown in the word table 40 in column 41 (FIG. 6) and they are preferably displayed as overlay next to and on the left side of each A-block 4 as shown in FIG. 5. It is imaginable to display also the center point 6 as a marking within the displayed image 2c.

The word "Mongolei", to which the attribute "1" is assigned and which is contained in A-block 10, 11 and 12, has the calculated highest probability to be the keyword 7 within the text of the captured image 2a, but despite of that it is not the desired keyword. The word "Volksrepublik", to which the attribute "2" is assigned and which is contained in the A-blocks 13 occurs three times within the text and has the next highest probability to be the keyword 7. The words of A-blocks 14, 15 and 7 are close to the center point 6 of the captured image 2a, respectively to the displayed image 2c and get so a relatively high probability according to the preferred keyword probability determination rule in this example.

For instance for an application, wherein a phone number shall be detected and selected for making a phone call with that number, it is imaginable, that the keyword probability determination rule detects only numbers with more than 6 digits and less than 15 digits or the like, preferably prioritizing numbers which have a word "phone" in front or above, wherein the corresponding blocks 3 are then selected as A-blocks 4 for the further selection.

Figure 7:
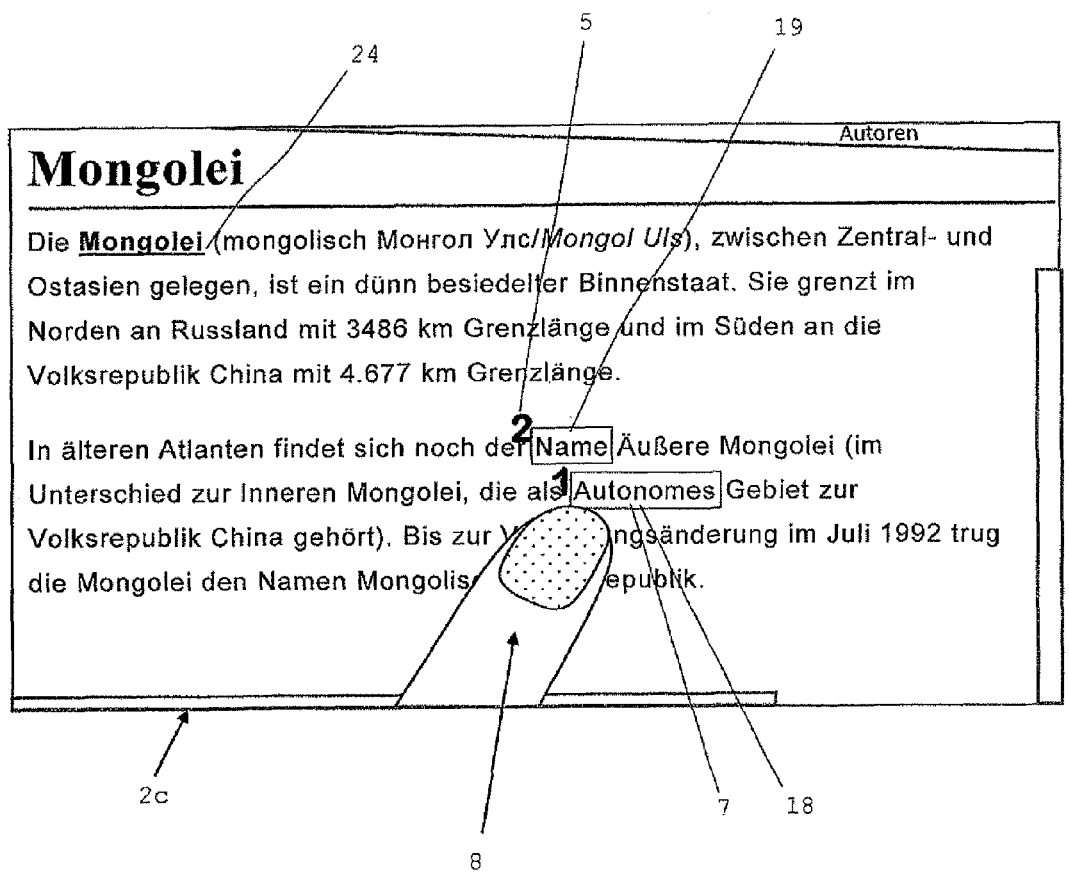
FIG. 7 shows an artifact reduced image of the section of the page containing text and a fingertip indicating the keyword.

Another preferred method for a keyword detection is shown in FIG. 7, wherein a fingertip 8 or a pen-tip (in the following the term fingertip will be used to designate both the fingertip and the pen-tip) is detected within the captured and displayed image 2c with its position and the direction. The fingertip indicates the word 18 among the detected word blocks 3, the word 18 being the keyword with the highest probability, whereupon preferably an attribute is assigned to the word respectively to the corresponding A-block. Another close word to the fingertip position and direction is the word 19, which gets highlighted and to which another attribute is assigned as well. The keyword 18 or 19, in this example, can then be further selected by a simple respective keypress.

Figure 8:
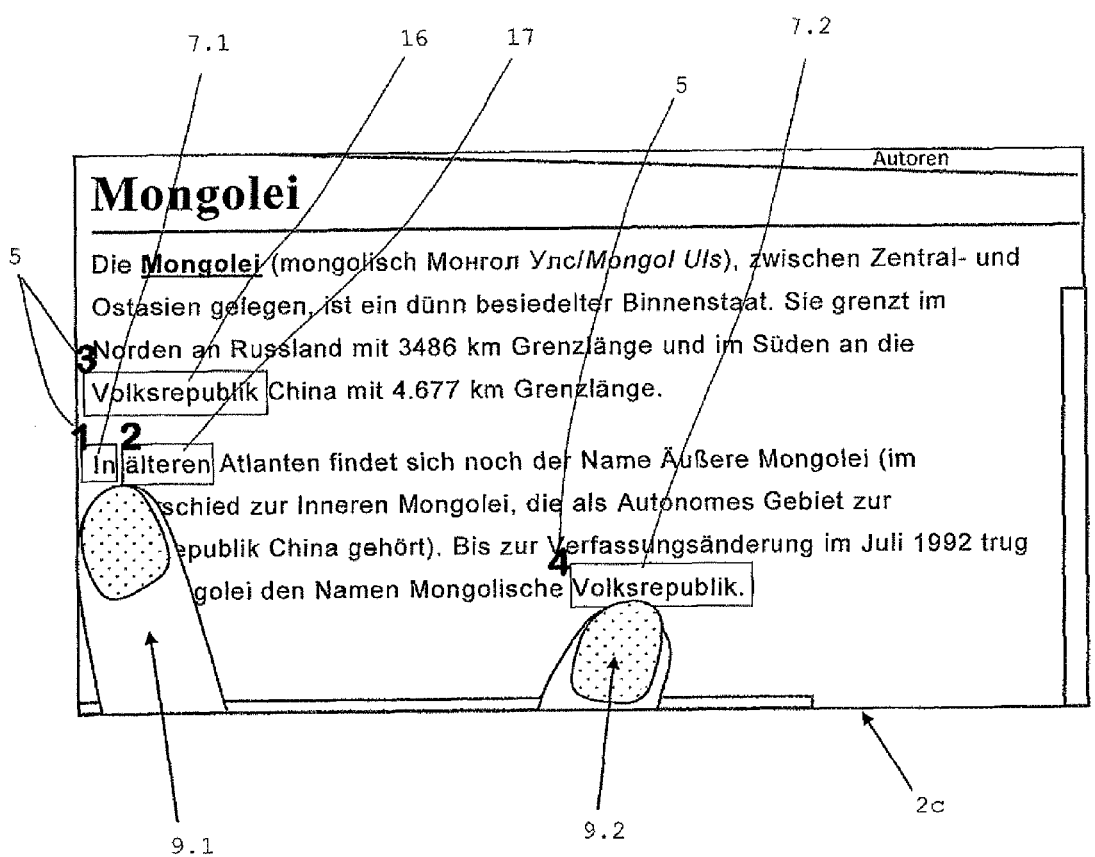
FIG. 8 shows two overlaid artifact reduced images of the section of the page containing text with a first position of the fingertip and a second position of the fingertip indicating a first keyword for a further selection and a second keyword for a further selection.

In case of an application in which a text-part comprising multiple words shall be detected as text input, the text-part gets selected by detection and selection of a first keyword 7.1, which is a starting word of the text-part and then by detection and selection of a second keyword 7.2, which is the last word of the text-part. The first 7.1 and the second keyword 7.2 get detected and selected as described before. An example is shown in FIG. 8, wherein the first keyword 7.1 is indicated by the fingertip 9.1, resulting in detected and selectable possible keywords 16, 17 and 7.1. Thereupon the fingertip 9.2 indicates the second keyword 7.2, which is then taken as the second keyword 7.2. If the probability of the so detected possible keyword 7.2, as in this example, is high enough in relation to all other neighboring possible keywords, then the possible keyword 7.2 with the very high probability does preferably not require a further selection by a keypress or a confirmation. Thereupon the text-part is taken as text input for the mobile communication device 30.

Figure 9:
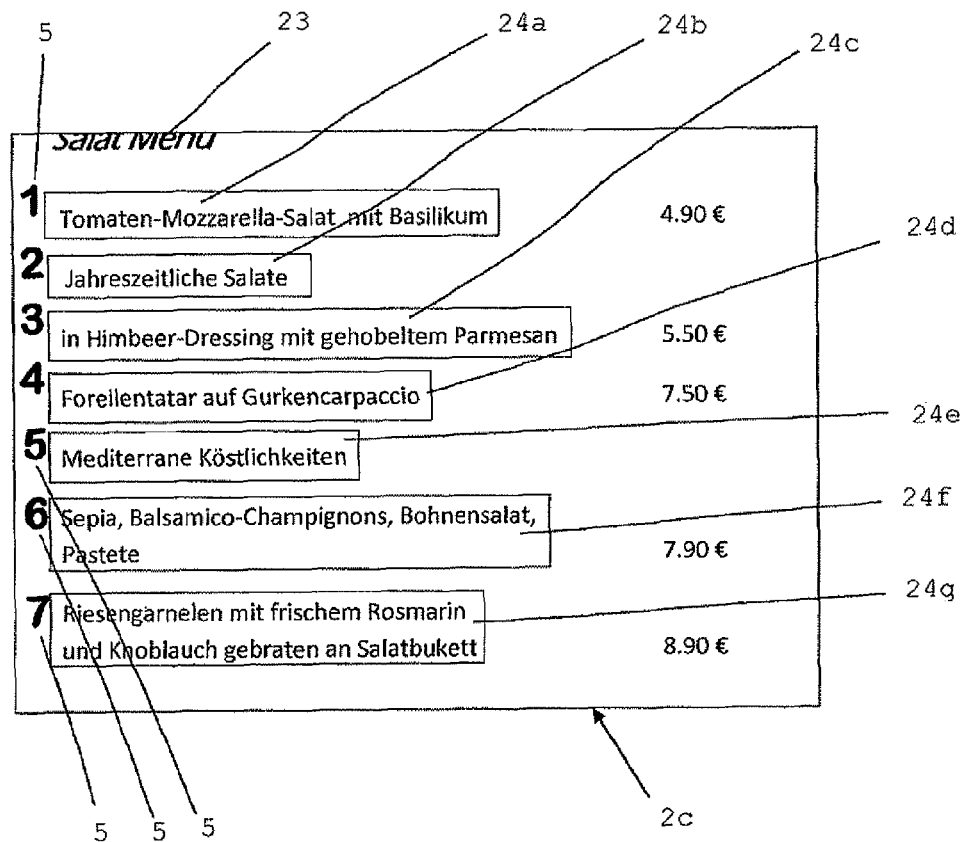
FIG. 9 shows the artifact reduced image of the section of the page containing a "salad menu" comprising text and it shows indicated word blocks containing text-parts.

Another preferred method for a text-part detection and selection is shown in FIG. 9, wherein the text-parts 24a-24g of the captured and artifact reduced image 2b are automatically detected by a pattern and structure analysis preferably before any OCR analysis which would require more calculating power. The pattern and structure analysis is preferably based on the detection of text characters and their distances to each other. The so detected text-parts 24a-24g get designated by attributes 5 which are preferably numbers and indicated in the displayed image 2c. It shall be mentioned that the margin words 23 are not further taken into account. The so indicated attributes 5 can be selected by a respective keypress and the text-part is taken as text input for the mobile communication device 30.

FIG. 10 shows the main process flow of the camera based method for text input and keyword detection which is self explanatory.

Preferably the method described above can also comprise a zoom function for the camera module before or after the image 2a is captured, whereas it is imaginable that it can be zoomed into the captured image 2a resulting in that a section of the captured image 2a is further processed and filtered, whereupon within the section of the captured image 2a the word blocks 3 get detected and further processed as described above.

Preferably the keyword probability determination rule determines words which are hand underlined with the highest priority within the artifact reduced image 2b.

The indication of A-blocks 4 is preferably performed as overlaid blocks in a certain color under the written possible keywords but other indications are also imaginable as frames around the A-blocks 4, that the displayed word therein is written in a different color and/or as bold letters or as big capital letters or the like. As attributes 5 numbers are preferred but characters or numbers followed by characters after the first nine numerals are also imaginable, as illustrated for instance in FIG. 6, the bottom five lines.

The further selection of the keyword 7, which is designated by its attribute 5 or by an indication of the respective A-block 4, is preferably performed by a keypress of the respective key of the keypad, whereas the keypad can also be a touch-screen. It is imaginable that the displayed and desired A-block 4 (respectively the keyword 7) can be also selected by arrow keys, a scroll-wheel or the like, wherein the selection jumps from A-block 4 to A-block 4 to the left, to the right, up or down in respect to the pressed key or scroll-wheel. A further selection of the respective attribute 5 via speech recognition is also imaginable. As a further alternative for the further selection of the keyword 7 or the corresponding A-block one use direct selection via touch screen if the mobile communication device includes the latter.

Upon the further selection of the keyword 7 or of the corresponding A-block a further correction of the displayed text is also imaginable which can be performed as usual by character keys or via T9-word corrective software which is available on most mobile communication devices 30.

The present invention shall not be limited to mobile communication devices 30 whereas it is also imaginable that the method gets applied on PCs, wherein a camera module is installed over a text page and the user has only to point out a certain keyword with his fingertip which gets detected and automatically selected for a translation for instance or for the like.

Moreover, the present invention can be applied also for automatic reading machines wherein a word which gets pointed out by a fingertip gets detected, converted into word characters and output by a loudspeaker device.

Furthermore it is imaginable to use this kind of rapid camera based keyword detection and selection for instance for quick search applications for word and text-block translations, for encyclopedia information, and for information related to the keyword, as for instance showing up in the display 32 manufacturers which are connected to the further selected keyword by a server database and the like.

Furthermore, although the present invention has been described in connection with certain specific embodiments of a mobile communication device 30 and flowcharts, the present invention is not limited thereto. Accordingly various modifications, adaptations and combinations of various features of the described embodiments can be practiced without departing from the scope of the present invention as set forth in the accompanying claims.

Where technical features mentioned in any claim are followed by reference signs, those reference signs have been included just for the sole purpose of increasing intelligibility of the claims and accordingly, such reference signs do not have any limiting effect on the scope of each element identified by way of example by such reference signs.

LIST OF REFERENCE NUMERALS

1 Page (also representing a screen or the like)
2a Captured image (=Section of the page)
2b Artifact reduced image (of the section of the page)
2c Displayed image
3 Word blocks
4 A-blocks (containing most likely the keyword)
5 Attribute
6 Center point (target point)
7 Keyword
7.1 First keyword
7.2 Second keyword
8 Fingertip
9.1, 9.2 Fingertip positions
10-19 Possible keywords
20-22 Line
23 Margin word
24 underline
24a-g Text-parts
30 Mobile Communication Device
31 Keypad
32 Display
40 word table
41-46 Table columns

The invention claimed is:

1. Camera based method for text input and detection of a keyword of a text-part within a printed page or a screen containing the keyword/text-part, the method comprising:
   a) directing a camera module on the printed page or on the screen and continuously displaying the image acquired by the camera module;
   b) capturing an image with the camera module, containing the keyword and text-part therein;
   c) detecting a plurality of word blocks contained in the captured image, each word block containing most likely a recognizable word;
   d) determining A-blocks among the plurality of word blocks according to a keyword probability determination rule, the keyword probability determination rule resulting in a respective probability value for each word block and being based at least in part on a spatial analysis of the word blocks relative to at least a portion of the captured image, the spatial analysis further being relative to an indication of a user intention of a keyword to obtain for selection, wherein each A-block contains most likely the keyword that a user of the camera module is intending to obtain for the selection from amongst the plurality of word blocks in the captured image, such that the A-blocks are preselected among the word blocks for the selection based upon each respective probability value of the A-blocks being above a threshold;
   e) upon the selection of an A-block, forwarding the text content of the selected A-block as text input to a current application running on a mobile communication device containing the camera or to a camera connected electronic device.

2. The method according to claim 1, comprising displaying the captured image, and
   f) digital image filtering of the captured image including contrast enhancement, shadow compensation, unwarping and rotation of the captured image in order to obtain an artifact reduced image with a substantially horizontal text alignment, wherein the detection of the plurality of word blocks is based on the artifact reduced image;
   g) performing OCR within each word block to get its text content;
   h) assigning to each A-block an attribute;
   i) indicating the A-blocks in the display by a frame or a background color and displaying their attributes as overlays within the artifact reduced and displayed image for the selection of the keyword;
   j) the selection of the A-block containing the keyword being based on the displayed attribute of the keyword; and
   k) upon the selection of the A-block, displaying the text content of the selected A-block.

3. The method according to claim 2, wherein the text-part which has to be detected comprises multiple words of the displayed image, the text-part starting with a first keyword and ending with a second keyword, and wherein (j) gets executed for the selection of the first keyword and for the selection of the second keyword, and wherein (e) comprises taking the text-part and forwarding it as text input to the current application.

4. The method according to claim 2, wherein at least one of (a), (b), (i) and (j) further comprises an additional zoom function to zoom the keyword or text-part in or out for a better targeting and selection possibility.

5. The method according to claim 2, wherein the keyword probability determination within (d) takes into account for each detected word contained in the word blocks a keyword probability parameter determined by a correlation with a database, the database containing words with a low probability and words with high probability, and whereupon the word blocks containing so calculated most likely keywords are preselected as A-blocks for the selection.

6. The method according to claim 1, wherein the keyword probability determination within (d) takes into account text characteristics or text part characteristics, and whereupon the word blocks containing so calculated most likely keywords are preselected as A-blocks for the selection.

7. The method according to claim 1, wherein the keyword probability determination of (d) takes into account a statistical analysis in how often the respective word occurs within the captured image or within a section thereof, or wherein the keyword probability determination takes into account the distance of the respective word block or A-block from the center point of the displayed image.

8. The method according to claim 2, wherein at least one of (c) and (d) comprises the detection of a fingertip or of a pen-tip within the artifact reduced image indicating the keyword, whereupon the position and the direction of the fingertip or the pen-tip is taken into account for the determination of the possible keywords with their respective A-blocks; or if there are detected two fingertips or pen-tips then the text in between is taken as text-part and forwarded as text input.

9. The method according to claim 2, wherein (j) further comprises the selection of the keyword among the predetermined indicated A-blocks via at least one of arrow keys and keypress.

10. The method according to claim 5, wherein the database for the keyword probability determination used in (d) is selectable among databases or is updatable from a connected server in regard to a use case or a currently running application for the detection of the keyword or wherein the selection of the database is accomplished within (d) according to a detected use case in regard to an analysis of the text contained in the artifact reduced image or of the words contained in the word blocks, respectively, or in regard to a detected image structure of the artifact reduced image.

11. The method according to claim 2, wherein at least one of (a), (b), (i), (j) comprise a displayed center point within the displayed image as a reticule, a cross-hair, a round or as a rectangle section whereas a size of the section is changeable; or
  wherein within (i) and (j), the detected A-blocks are indicated in the display by a highlighted background or by a highlighted text therein or by a highlighted frame in black, white or in any color; or
  wherein within (j) the selection of the assigned A-block is done by manually touching on the respective A-block within the touch-screen display, or wherein the text-part gets selected by sliding with a pen or the like along the respective text on the touch-screen display; or wherein the selection of the assigned A-block gets done via voice recognition.

12. The method according to claim 2, wherein (e) comprises an automatic or semi-automatic correction of the text content of the selected A-block containing the keyword, before forwarding it as the text input to the current application.

13. The method according to claim 2, wherein within (d) the keyword probability determination rule takes into account a database which is related to an application or the text or structure of the artifact reduced image.

14. The method according to claim 2, wherein within (d) the keyword probability determination rule detects in particular phone numbers within the artifact reduced image as possible keywords for the selection thereof.

15. The method according to claim 2, wherein (c) comprises the detection of text-parts within the captured and artifact reduced image which get designated by attributes within step (h), whereupon within (j) one of the text-parts is selectable whereupon the text-part gets OCR converted and used as text input.

16. The method according to claim 1, wherein within (e) the detected and selected text-part is taken as first text input and sent to a server system, whereupon data related to the selected text-part get received from the server system and displayed in the display for another selection as the text input to the current running application.

17. The method according to claim 2, wherein (h) further comprises enumerating the attributes for the A-blocks starting from a center point of the displayed image and increasing up towards the margins.

18. The method according to claim 1, wherein the indication of the user intention of the keyword to obtain for selection comprises at least one of a center point of the image and an indication by a fingertip or pen tip.

19. The method according to claim 1, wherein the forwarding the text content of the selected A-block is performed upon selection of the A-block by speech recognition.

* * * * *